(12) United States Patent
Marino

(10) Patent No.: US 7,035,988 B1
(45) Date of Patent: Apr. 25, 2006

(54) HARDWARE IMPLEMENTATION OF AN N-WAY DYNAMIC LINKED LIST

(75) Inventor: John Marino, Mountain View, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 330 days.

(21) Appl. No.: 10/696,257

(22) Filed: Oct. 28, 2003

Related U.S. Application Data

(60) Provisional application No. 60/455,624, filed on Mar. 17, 2003.

(51) Int. Cl.
*G06F 12/02* (2006.01)

(52) U.S. Cl. ..................................... 711/170
(58) Field of Classification Search ............... 711/170, 711/173, 154
See application file for complete search history.

(56) References Cited

U.S. PATENT DOCUMENTS

| | | | |
|---|---|---|---|
| 5,838,915 A * | 11/1998 | Klausmeier et al. | 709/215 |
| 6,430,666 B1 * | 8/2002 | Roth | 711/202 |
| 6,694,388 B1 * | 2/2004 | Schzukin et al. | 710/52 |
| 2002/0029327 A1 * | 3/2002 | Roth | 711/217 |
| 2003/0120879 A1 * | 6/2003 | Chen et al. | 711/154 |
| 2004/0073553 A1 * | 4/2004 | Brown et al. | 707/100 |
| 2004/0181504 A1 * | 9/2004 | Chang et al. | 707/1 |
| 2004/0257891 A1 * | 12/2004 | Kim et al. | 365/200 |
| 2005/0234933 A1 * | 10/2005 | Lin | 707/100 |
| 2005/0235129 A1 * | 10/2005 | Sokol | 711/170 |

* cited by examiner

*Primary Examiner*—Kevin L. Ellis
(74) *Attorney, Agent, or Firm*—Townsend and Townsend and Crew LLP

(57) ABSTRACT

A hardware-implemented N-way dynamic link list is disclosed. The linked list memory structure comprises two basic parts for each stored location (entry)—a data element and pointer to the next element. Separate memory components provide a data organization that efficiently accesses any of N queues.

20 Claims, 10 Drawing Sheets

(write)

(write)

(read)

(read)

Fig. 8E

T1 = 17
bRAM (17) ← data4
pop fRAM = 19
nRAM(17) ← 19
T1 ← 19

| f RAM |
|---|
| 16 |
| 17 |
| 18 |
| T → 19 |
| T → 20 |
| 21 |
| ⋮ |
| B → $2^{12}$ - 1 |

| n RAM | |
|---|---|
| 1 | 16 |
| 3 | 18 |
| | |
| 16 | 17 |
| 17 | 19 |
| | |

| b RAM | |
|---|---|
| 1 | data1 |
| 3 | data3 |
| | |
| 16 | data2 |
| 17 | data4 |
| | |

Fig. 8F

T3 = 18
bRAM (18) ← data5
pop fRAM = 20
nRAM(18) ← 20
T3 ← 20

| f RAM |
|---|
| 16 |
| 17 |
| 18 |
| 19 |
| T → 20 |
| T → 21 |
| ⋮ |
| B → $2^{12}$ - 1 |

| n RAM | |
|---|---|
| 1 | 16 |
| 3 | 18 |
| | |
| 16 | 17 |
| 17 | 19 |
| 18 | 20 |
| | |

| b RAM | |
|---|---|
| 1 | data1 |
| 3 | data3 |
| | |
| 16 | data2 |
| 17 | data4 |
| 18 | data5 |
| | |

Fig. 8G

H1 = 1
bRAM (1) = data1
nRAM(1) = 16
fRAM ← H1 (push)
H1 ← 16

| f RAM |
|---|
| 16 |
| 17 |
| 18 |
| 19 |
| 20 |
| T → 21 |
| ⋮ |
| B → $2^{12}$ - 1 |
| B → 1 |

| n RAM | |
|---|---|
| 1 | ~~16~~ |
| 3 | 18 |
| | |
| 16 | 17 |
| 17 | 19 |
| 18 | 20 |
| | |

| b RAM | |
|---|---|
| 1 | ~~data1~~ |
| 3 | data3 |
| | |
| 16 | data2 |
| 17 | data4 |
| 18 | data5 |
| | |

HARDWARE IMPLEMENTATION OF AN N-WAY DYNAMIC LINKED LIST

CROSS REFERENCE TO RELATED APPLICATIONS

This is a non-provisional application which claims priority from U.S. Provisional Application No. 60/455,624, filed Mar. 17, 2003, and is herein incorporated by reference for all purposes.

BACKGROUND OF THE INVENTION

The present invention is generally related to logic circuits, and in particular to logic for implementing a linked list mechanism.

A linked list is a data structure used in application programs to store data that is dynamic in nature. A linked list comprises two basic components: a data element and a pointer to the next element in the linked list. In software, a linked list can grow simply by allocating memory from the operating system (OS) for each new node (entry) in the linked list. Conversely, a linked list can shrink by freeing the memory allocated for one or more nodes (entries) and returning it to the OS. The OS typically provides a memory management component to manage the allocation and deallocation of memory for a application.

In more specialized systems, memory resources are usually more limited and therefore must be allocated more efficiently. For example, there may not be sufficient memory capacity to provide for a sophisticated OS. Nonetheless, link list capability may still be needed for applications running on these specialized systems. One approach is for the application to allocate a block of memory and to manage the link lists from that memory. When more than one link list is needed, there are two approaches for allocating the link lists: statically or dynamically. Statically allocating memory for N linked lists is not an efficient allocation strategy. Some lists may grow beyond their statically allocated size, while other lists may be underutilized. Since the lists are statically allocated, memory from the underutilized lists cannot be allocated to lists which have grown beyond their predefined sizes. Dynamic allocation from the block of memory requires more processing time; however, memory usage is more efficient.

BRIEF SUMMARY OF THE INVENTION

In accordance with the present invention an N-way linked list capability is provided using a dynamic allocation strategy provided in hardware. A first memory stores a pointer to the beginning and end of a linked list. The first memory stores many such pointers, thus providing for many linked lists. A second memory stores the data component of the entries (nodes) which comprise a linked list. An additional memory stores information that indicates the order of the entries of a linked list. Still another memory stores a list of available memory locations in the second memory. Suitable control circuitry is provided to perform dynamic allocation and deallocation of memory for entries in the linked lists. Each entry can be allocated to any linked list, and any entry can be freed from a linked list and subsequently reallocated another linked list. The invention avoids "dead spots" that can arise when linked lists are statically defined, where entries of an underutilized linked list cannot be used to grow a linked list that has reached its limit.

BRIEF DESCRIPTION OF THE DRAWINGS

The features and advantages of the present invention will be more clearly understood from the following description taken in conjunction with the accompanying drawings in which:

FIGS. 8A–8J show snapshots of the various memory components during a sequence of writes and a read operation in accordance with the invention.

DETAILED DESCRIPTION OF THE INVENTION

Figure 1:
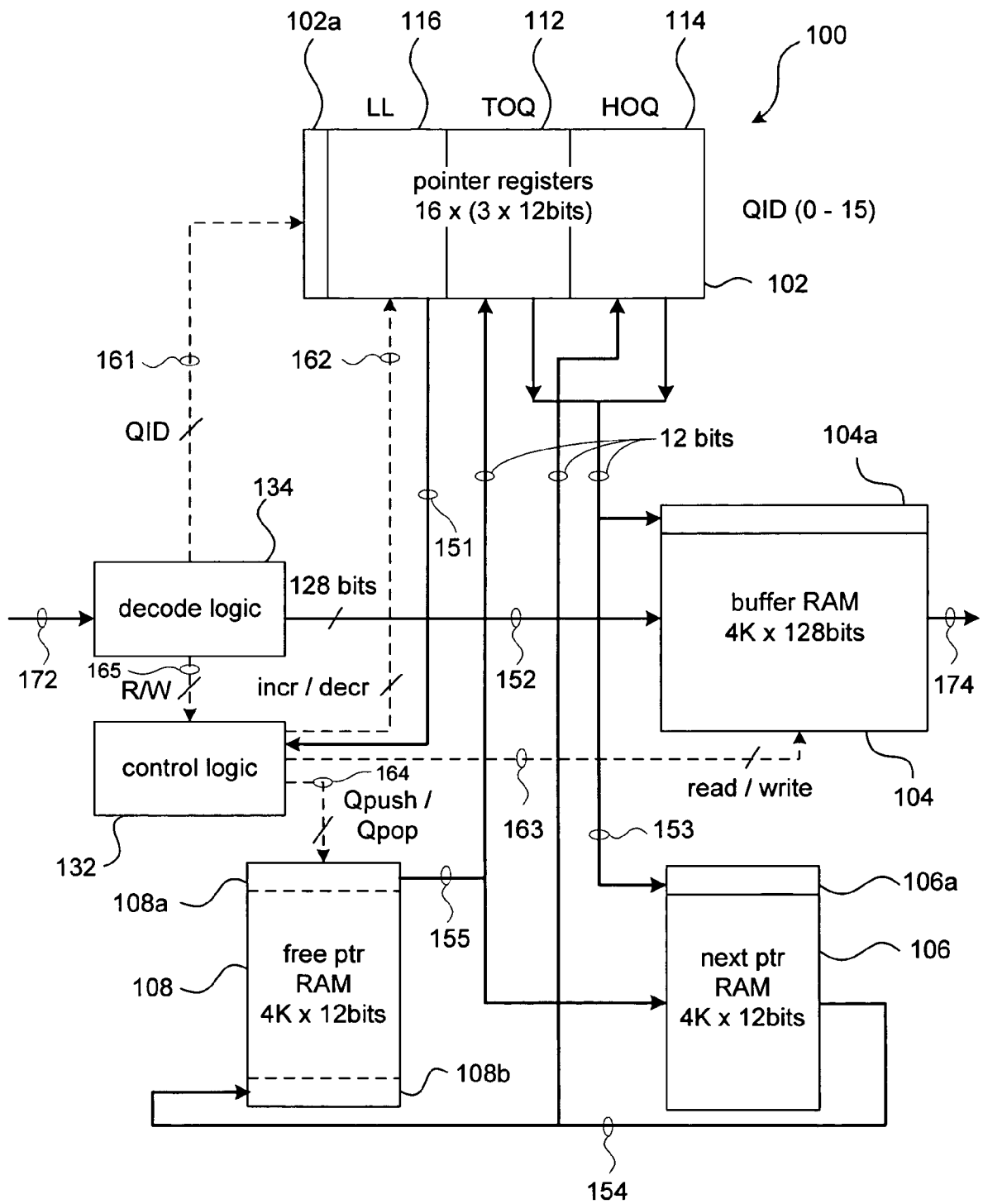
FIG. 1 is a high level block diagram illustrating an embodiment of the present invention.

FIG. 1 illustrates a typical embodiment of the present invention. A hardware queue 100 according to the embodiment exemplar shown in FIG. 1 includes a register file 102 comprising three register sets. A tail of queue (TOQ) register set 112, a head of queue (HOQ) register set 114, and link length (LL) register set 116. In the discussion which follows, the same reference numeral will be used to refer to both a register set and to an individual register in the register set, depending on the context of the discussion. Suitable control logic 102a provides access to the individual registers comprising the register sets for data read and write operations.

The particular implementation of the register file 102 shown in FIG. 1 provides for 16 queues. Each queue is a linked list, and has an associated head pointer to the head entry in the linked list, a tail pointer to the associated tail entry in the linked list, and a length indicator indicating the number of entries in the linked list. Thus, each register triplet in the register file comprising an HOQ register, a TOQ register, and a LL register represents a queue. Each register set 112, 114, 116 therefore comprises sixteen registers, to provide for 16 queues. Information stored in the HOQ and TOQ registers represents an address. In the implementation shown, addressing is assumed to be 12-bit addressing to provide 4K (1K=1024) of address space. Therefore, each register set is 12 bits wide, including the LL register in the case where a queue grows to 4K entries. By convention, the queues are numbered from 0–15, using notation such as Q0–Q15 to identify each queue. The hardware shown in FIG. 1 therefore is said to implement a 16-way dynamic link list. The "dynamic" aspect of the invention will be discussed below.

A buffer RAM 104 serves as the data space for the queues. Each datum in this particular implementation is assumed to be 128 bits wide, although of course, any data size can be accommodated. Each memory location in the buffer RAM represents the data field of an entry in a linked list. The buffer RAM is therefore a 4K×128 bit memory, for a maximum number of 4K entries. The figure also shows control logic 104a is provided to access memory in the buffer RAM, for reading an accessed memory location and for writing an accessed memory location.

A next pointer RAM 106 is provided by a 4K×12 bit memory. The next pointer RAM stores addresses of memory in the buffer RAM 104, hence the 12 bit data width of the memory. The next pointer RAM will be discussed further, but briefly, addresses stored in this memory are organized in a manner that indicate the link order of the entries of a queue. Control logic 106a is provided to access memory in the next pointer RAM, for reading an accessed memory location and for writing an accessed memory location.

A free pointer RAM 108 is provided by a 4K×12 bit memory. This memory stores addresses of memory in the buffer RAM 104. Since the buffer RAM contains 4K memory locations, this particular implementation of the free pointer RAM contains is at least a 4K×12 bit memory. As the name implies, the free pointer RAM contains the addresses in the buffer RAM of those memory locations that have not been allocated to an entry in a queue. Though this memory is referred to as a RAM (random access memory), the free pointer memory is accessed in FIFO (first-in, first-out) fashion. Data is "pushed", i.e., written into the free pointer RAM at the bottom of the queue, logically shown in the figure at 108b. Data is read from the free pointer RAM ("popped") at the top of the queue, logically represented as 108a.

Controller logic comprises decoder logic 134 and control logic 132. The decoder logic includes an input bus 172 that is configured to receive incoming data comprising a queue identifier (QID), an operation (i.e., read, write), and data to written in the case of a write operation. The decoder logic produces a suitable control signal(s) 161 for controlling the register file 102 to select a register triplet based on the QID. Another control signal 165 is provided to the control logic 132 to indicate to the control logic whether an incoming operation is a write operation to one of the queues or a read operation from one of the queues.

The control logic 132 is configured to generate various control signals for synchronizing and otherwise controlling the actions of the other components shown in the figure. A control signal 162 controls the register file 102 to increment or decrement the content of one of the LL registers 116, selected based on the QID. It can be appreciated that the control logic 102a associated with the register file can be further configured to perform the increment or decrement operation on the selected LL register. A control signal 163 controls whether data is written to the buffer RAM 104 or read from the buffer RAM. A control signal 164 controls the free pointer RAM 108 to perform a "push" operation of a "pop" operation, depending on the incoming operation detected by the decoder logic 134.

An address bus 153 is coupled to an output of the HOQ register set 114 and to an output of the TOQ register set 112. The address bus feeds into the control logic 104a of the buffer RAM 104 and to the control logic 106a of the next pointer RAM 106. A register can be selected from among the HOQ register set and the TOQ register set, and the data contained in the selected register can be driven onto the address bus to feed the data as address to the buffer RAM and to the next pointer RAM. In the particular implementation shown in FIG. 1, the address bus is a 12-bit bus.

A 128-bit data bus 152 feeds data from the decoder logic 134 to the buffer RAM 104. The data is then written to an accessed memory location in the buffer RAM. Incoming data received by the decoder logic includes a data component when the operation is a write operation. It can be appreciated that the decoder logic can be configured to obtain the data associated with a write operation and to provide that data on the data bus.

A data bus 155 feeds data that is popped from the free pointer RAM 108 to the next pointer RAM 106 and to the TOQ register set 112. Data from the free pointer RAM is stored to an accessed memory location in the next pointer RAM. Similarly, data from the free pointer RAM is stored in the TOQ register that is selected based on the incoming QID.

A data bus 154 feeds data from an accessed location in the next pointer RAM 106 to the free pointer RAM 108 and to the HOQ register set 112. Data from the next pointer RAM is pushed onto the bottom 108b of the queue provided by the free pointer RAM. Data from the next pointer RAM is stored to one of the HOQ registers determined by the QID.

A data bus 151 feeds data from a selected LL register 116 to the control logic. The LL register that is selected is based on the incoming QID.

The following initial conditions are set when the circuit shown in FIG. 1 is reset. The register file 102 can be initialized as follows, where Qn is the $n^{th}$ queue, H[T]n is the content of the H[T]OQ register 114 [112] of the $n^{th}$ queue and Ln is the LL register of the $n^{th}$ queue:

| | |
|---|---|
| Q0: | T0 = 0, H0 = 0, LL = 0 |
| Q1: | T1 = 1, H1 = 1, LL = 0 |
| Q2: | T2 = 2, H2 = 2, LL = 0 |
| . | |
| . | |
| . | |
| Q14: | T14 = 14, H14 = 14, LL = 0 |
| Q15: | T15 = 15, H15 = 15, LL = 0 |

As will be explained below, the convention for writing to a queue in accordance with this embodiment of the invention is to assume that the TOQ register always contains the address of the memory location in the buffer RAM 104 to which the data will be written. Hence, the first entry for Q0 is location 0 in the buffer RAM. The first entry in Q1 is location 1 in the buffer RAM, and so on.

Recall that the free pointer RAM 108 is accessed as a queue. There is the notion of the "top" of the queue and the "bottom" (or tail) of the queue. The free pointer RAM stores the list of addresses of memory locations in the buffer RAM 104 that have not been allocated to a queue. The top of the queue is a memory location in the free pointer RAM that contains the first memory location in the buffer RAM that will be allocated. When a memory location in the buffer RAM is freed (e.g., as the result of a read operation), the address of the freed memory location is pushed to the bottom of the queue in the free pointer RAM.

The first sixteen memory locations in the 4K buffer RAM 104 have already been allocated to their respective queues. Thus, 4K less 16 entries remain in the buffer RAM for allocation. The free pointer RAM 108 is initialized as follows:

| | |
|---|---|
| top → | 16 |
| | 17 |
| | 18 |
| | . |
| | . |
| bottom → | $2^{12} - 1$ |

The top of the queue contains the memory location 16 and the bottom of the queue contains the memory location $2^{12}-1$.

When the free pointer RAM "popped", the address 16 will be produced and the top of the queue will then contain the memory location 17, and so on. When a freed memory location is "pushed" onto the queue, then the bottom of queue will contain the pushed memory location.

It can be appreciated that the register file 102 can be initialized with different values. The free pointer RAM 108 would have to be initialized accordingly to reflect the memory locations that are initially assigned to the queues. It can be further appreciated that the order of the memory locations initially stored in the free pointer RAM can be some other order.

The buffer RAM 104 does not require initialization, since all queues are initially empty and the first operation that makes sense for each queue after the initialization is a write operation. Similarly, the next pointer RAM 106 does not require initialization. Since each queue is of length zero at initialization, there is no "next" entry to speak of at that time. Nonetheless, it may be desirable to explicitly set all memory locations in the buffer RAM and the next pointer RAM to some value, e.g., "0" or all "1"s.

Figure 2:
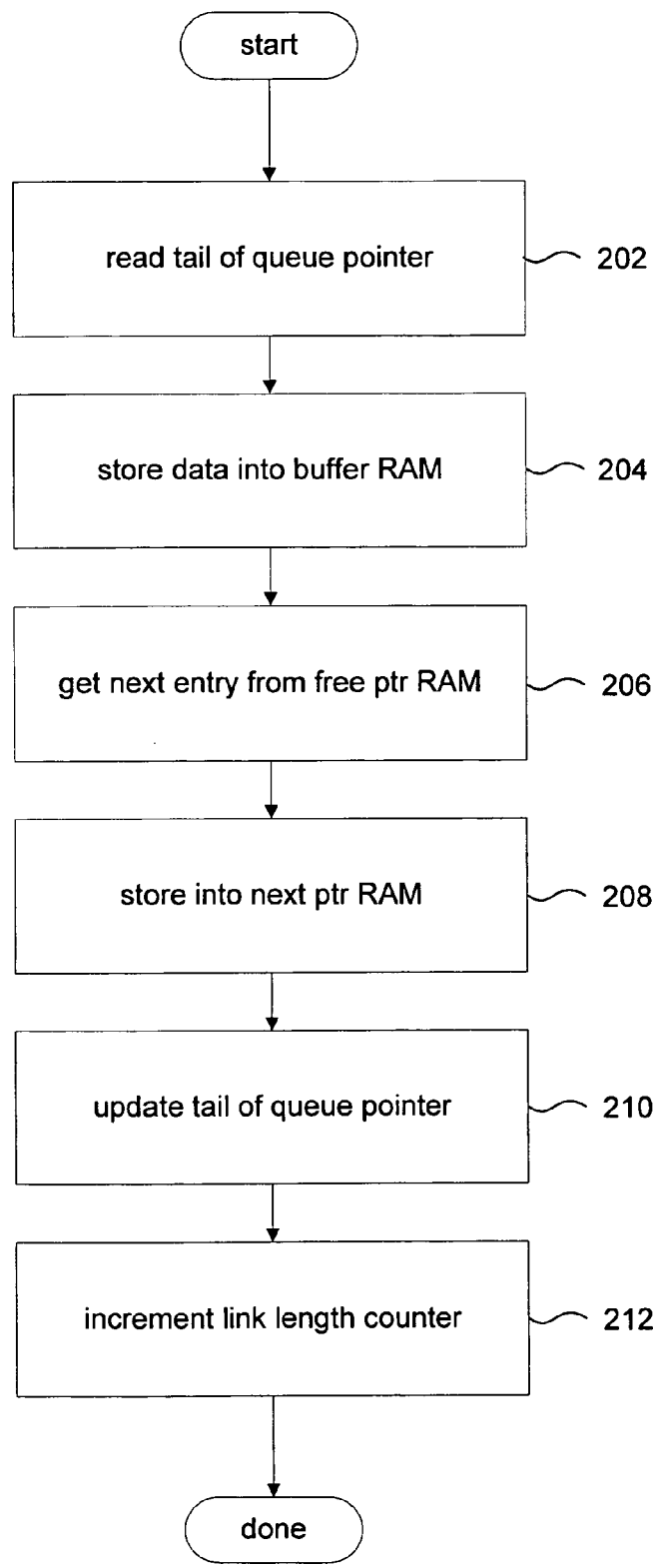
FIG. 2 highlights the processing steps for a write operation in accordance with an embodiment of the present invention.
Figure 3:
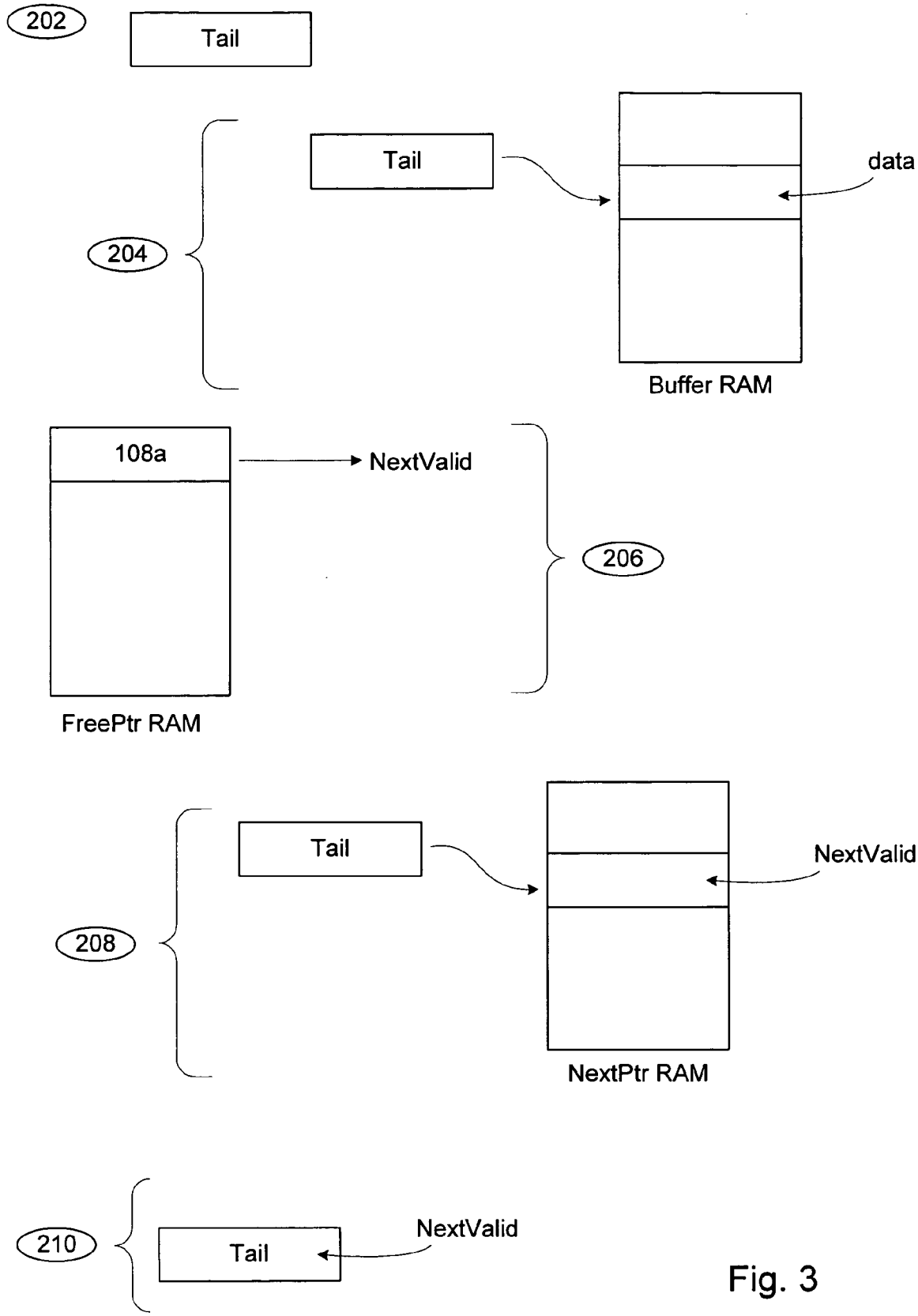
FIG. 3 illustrates the data flow during a write operation.
Figure 4:
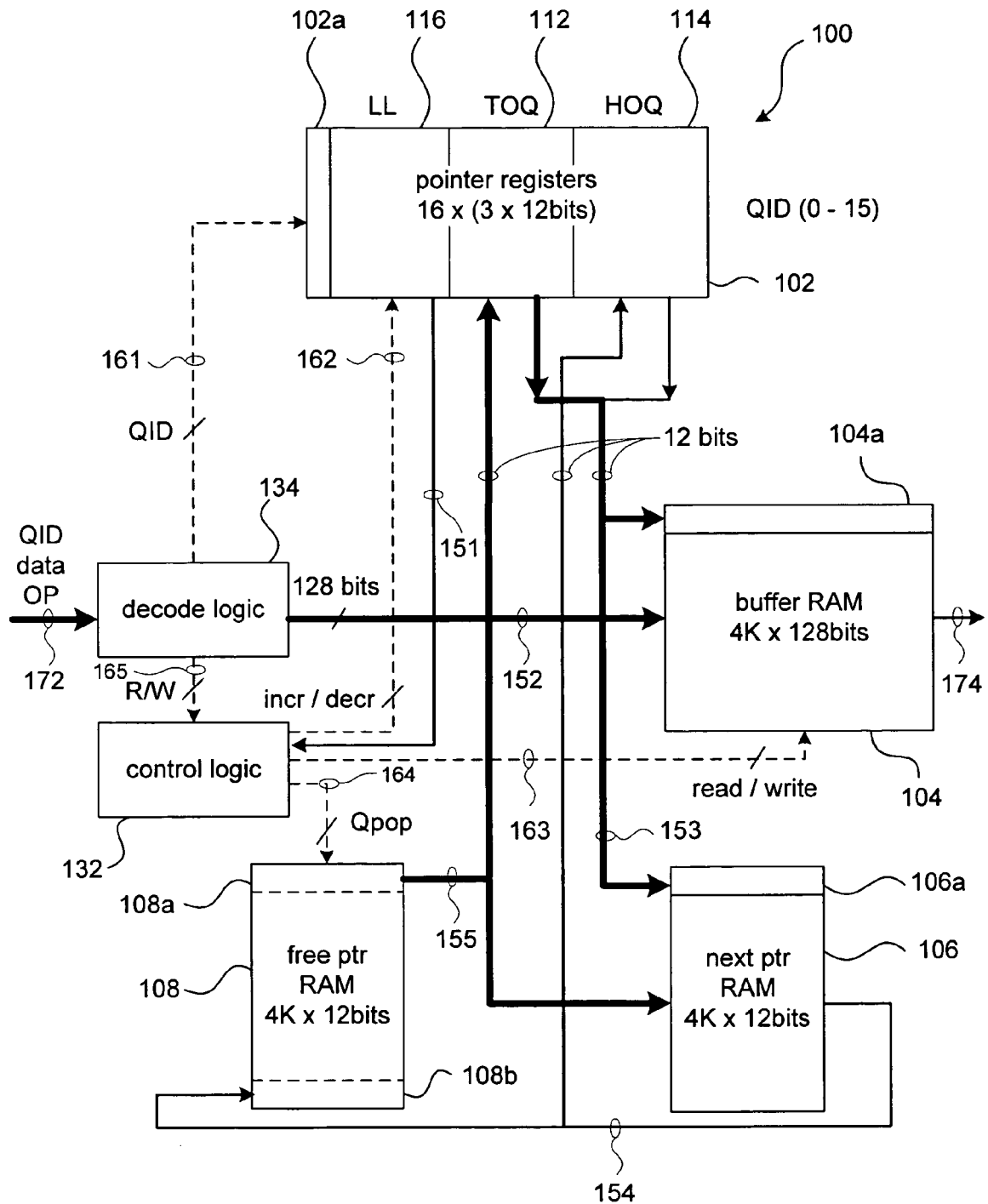
FIG. 4 highlights the address and data buses of FIG. 1 during a write operation.

Refer now to FIGS. 2, 3, and 4 for a discussion of a write operation in accordance with the embodiment of the invention shown in FIG. 1. FIG. 2 is a high level flow chart, highlighting the steps comprising a write operation on a queue. FIG. 3 graphically represents the data flow among the elements of the circuit shown in FIG. 1 during a write operation. FIG. 4 highlights the data flow in the circuit diagram of FIG. 1 during a write operation. It can be appreciated that the decoder logic 134 and the control logic 132 can be configured to perform the operations that will be discussed in connection with a write operation.

When a data write request is communicated to the circuit of FIG. 1, the request comprises a queue identifier (QID), the data to be written, and an indication of the operation to be performed, i.e., a write operation. In a step 202, the register file 102 is accessed with the QID to access the TOQ register 112 corresponding to the QID. This is illustrated in FIG. 3 as the production of the tail register, identified by the step reference 202. The content of the tail register is a memory location in the buffer RAM 104 into which the data will be stored. Thus, in a step 204, a memory location in the buffer RAM is accessed and the data is written into the accessed memory location. FIG. 3 shows the tail register "pointing" to the accessed memory location.

Then in a step 206, the top of the queue in the free pointer RAM 108 is popped. This is indicated in FIG. 3 by the production of NextValid which represents a location in the buffer RAM that will be used to store the next data value that is written to the specified queue.

In a step 208, the content of the selected TOQ register 112 is used to access a memory location in the next pointer RAM 106. The NextValid value is stored in that accessed location. FIG. 3 reflects this action in the graphic identified by 208.

In a step 210, the NextValid value is then loaded into the selected TOQ register. Completing the discussion of FIG. 2, step 212 is performed to increment the LL register corresponding to the QID to indicate that the specified queue now contains one more entry.

Figure 5:
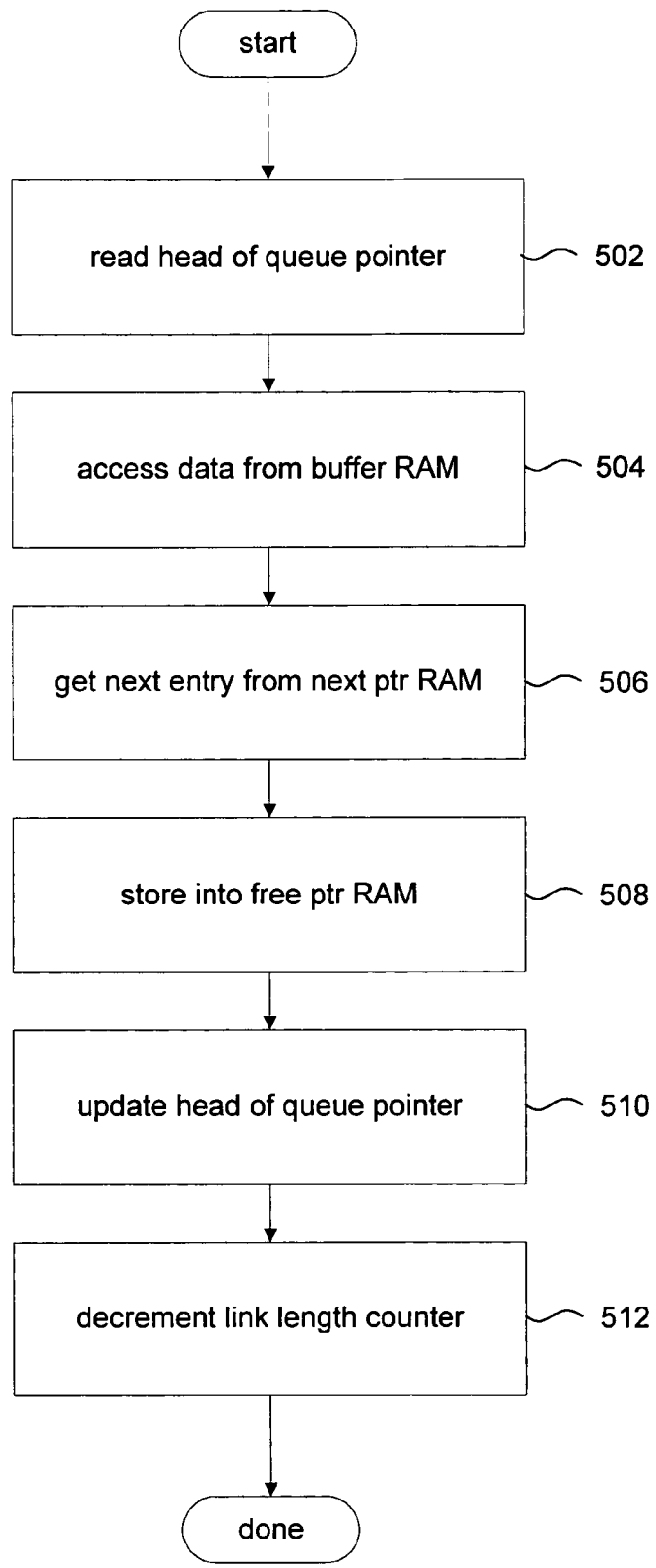
FIG. 5 highlights the processing steps for a read operation in accordance with an embodiment of the present invention.
Figure 6:
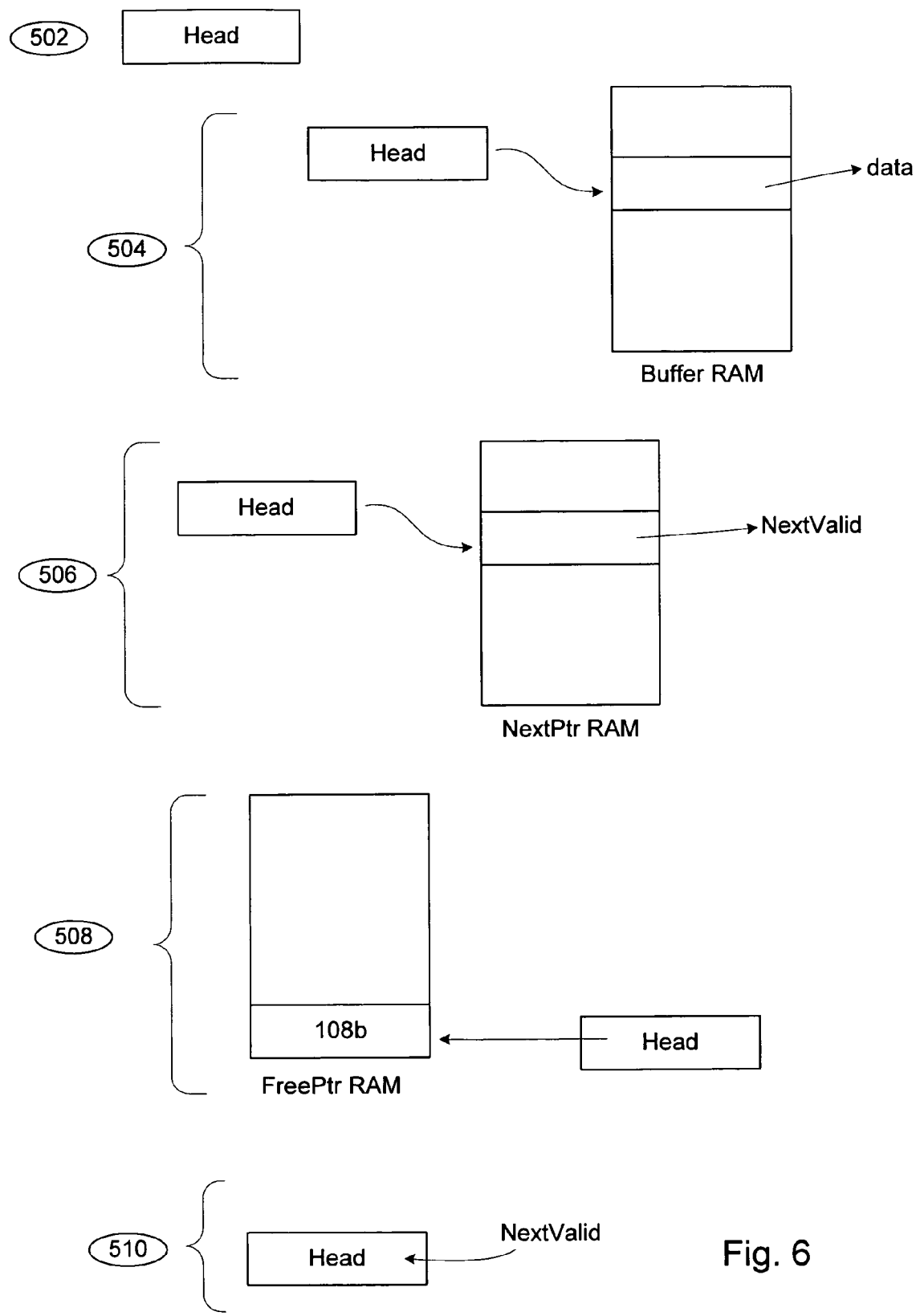
FIG. 6 illustrates the data flow during a read operation.
Figure 7:
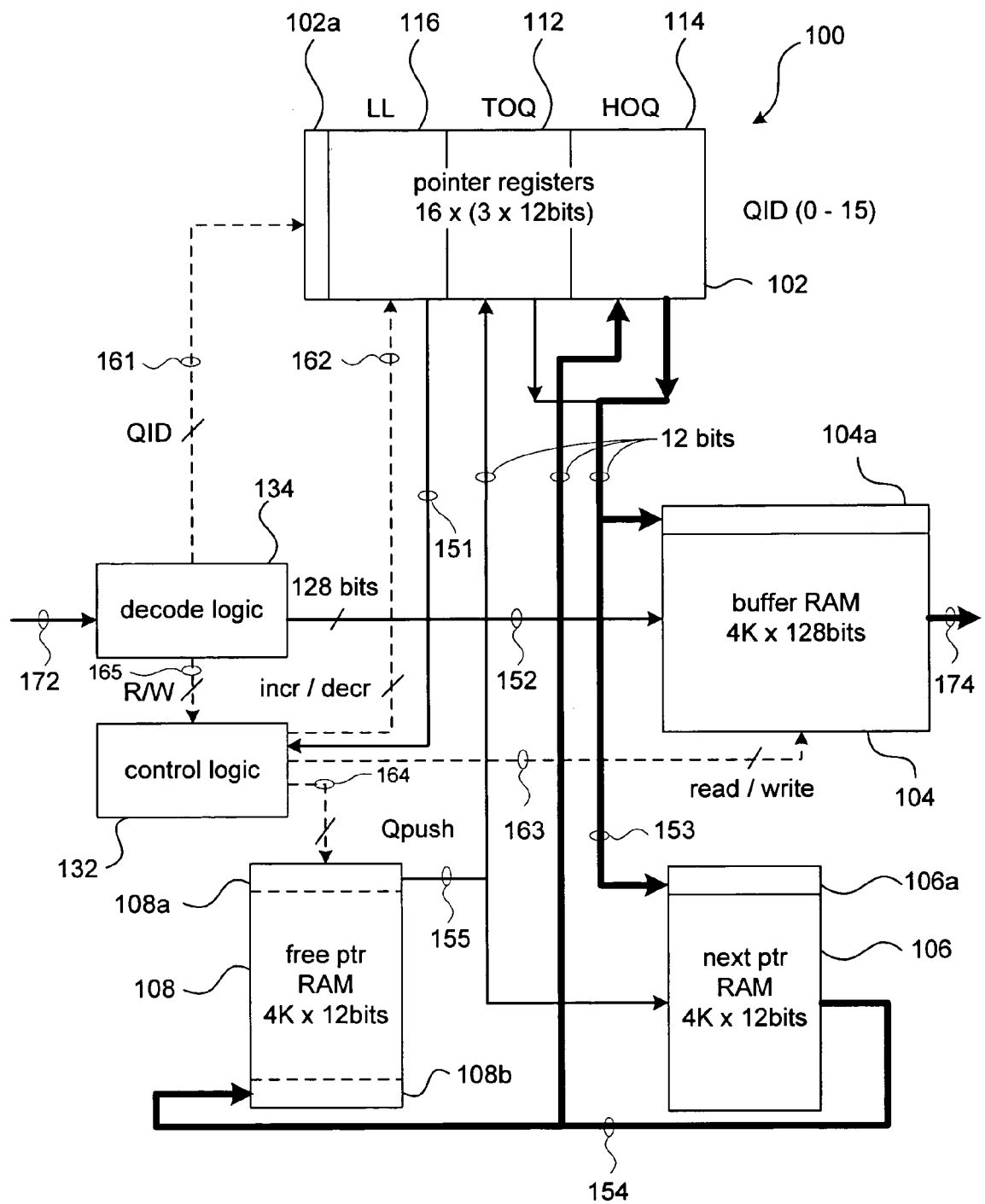
FIG. 7 shows the address and data buses shown in FIG. 1 that are involved during a read operation.

Refer now to FIGS. 5, 6, and 7 for a discussion of a read operation in accordance with the embodiment of the invention shown in FIG. 1. FIG. 5 is a high level flow chart, highlighting the steps comprising a read operation on a queue. FIG. 6 graphically represents the data flow among the elements of the circuit shown in FIG. 1 during a read operation. FIG. 7 highlights the data flow in the circuit diagram of FIG. 1 during a read operation. It can be appreciated that the decoder logic 134 and the control logic 132 can be further configured to perform the operations that will be discussed in connection with a read operation.

When a request to read a queue is communicated to the circuit of FIG. 1, the request comprises a QID and an indication of the read operation. In a step 502, the register file 102 is accessed to access the HOQ register 114 corresponding to the specified queue (see also FIG. 6). In a step 504, the memory location in the buffer RAM 104 pointed to by the content of the HOQ register is accessed and read out on a data bus 174 of the buffer RAM.

In a step 506, the content of the HOQ register is used to access a memory location in the next pointer RAM 106. The content of the accessed memory location in the next pointer RAM represents the next entry in the specified queue. FIG. 6 shows this value as being identified by NextValid. Then in a step 508, the content of the HOQ register is pushed onto the queue in the free pointer RAM 108, thus freeing the location in the buffer RAM 104 that was just read.

The NextValid value is then loaded into the HOQ register, step 510. To complete the flow chart of FIG. 5, the LL register corresponding to the specified queue is decremented by one to indicate there is now one less entry in that queue.

It is worth noting that the control logic 132 can be configured to track how much space remains in the buffer RAM 104 to detect when the memory is full. This can be used to trigger an overflow condition to indicate there is no more space for a new queue entry. It can be appreciated that any of a number of techniques can be used to detect a "memory full" condition. For example, the top of queue and bottom of queue can be monitored. A global counter can be used and checked each time a write operation is detected, and incremented after a successful write operation. The individual LL registers can be summed each time a write operation is detected.

The control logic can be further configured to detect an attempt to read an empty queue. This may not be necessary if it can be assumed that the system in which the invention is incorporated will behave correctly and not make an attempt to read an empty queue.

Figure 8A:
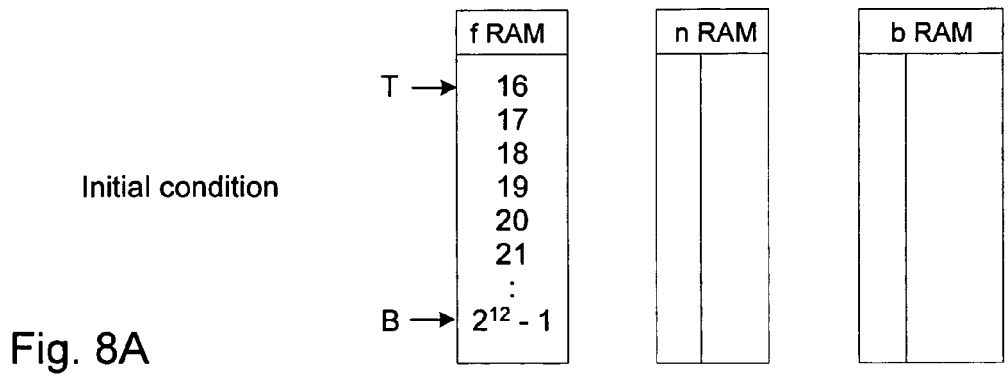

FIGS. 8A–8J show a sequence of write operations and read operations to illustrate the operation of this particular embodiment of the invention. FIG. 8A represents the initialized state of the circuit of FIG. 1. Notably, the free pointer RAM (fRAM) is initialized as discussed above. The top of queue (T) points to the first available memory location in the buffer RAM (bRAM), and the bottom of queue (B) points to the last available memory location. The next pointer RAM (NRAM) and the bRAM may or may not be initialized. suppose the following operations are performed:

write "data1" to queue 1 (Q1)
    write "data2" to Q1
    write "data3" to queue 3 (Q3)
    write "data4" to Q1
    write "data5" to Q3
    read from Q1
    read from Q3
    read from Q3
    write "data6" to Q3

Figure 8B:
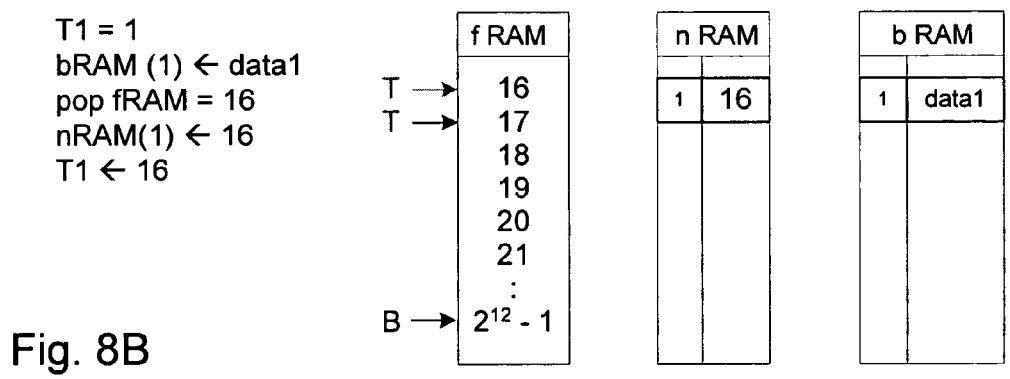

The first write operation is a write operation of data (data1) to Q1. FIG. 8B summarizes the data flow for this write operation. The TOQ register for Q1 is accessed. The content of the register T1 contains the value "1" per the initialization sequence discussed above. In accordance with step 204 (FIG. 2), memory location "1" in the bRAM is written; the notation "bRAM(1)←1" will be used to represent the action. The FRAM is then popped (step 206); this will produce the value 16, since it was at the top of the queue. As can be seen in FIG. 8B, after the pop operation, the top of the queue moves down to the next entry in the fRAM queue, and now points to "17" in the fRAM. The value ("16") that was popped represents the memory location in the buffer RAM for data of the next entry in Q1. The popped value is stored in the next pointer RAM at the memory location determined based on the content of the T1 register (TOQ register for Q1), step 208. The popped value is then loaded into the T1 register, 210. It is understood that the corresponding link length counter for Q1 is incremented.

Figure 8C:
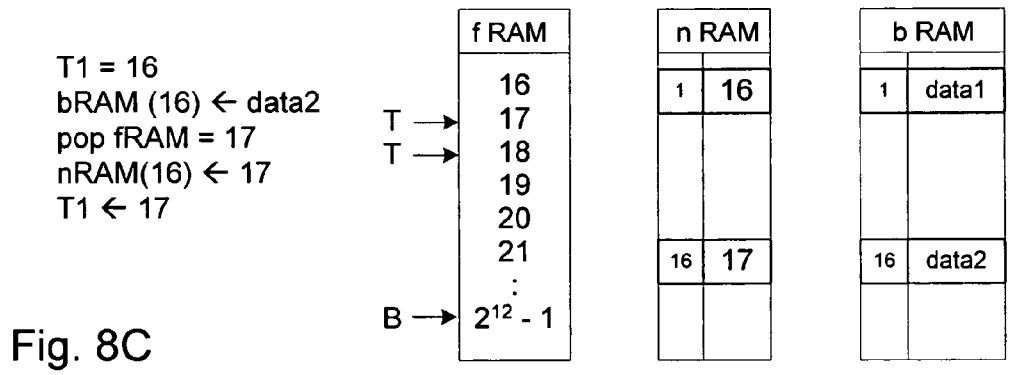

The next operation is a write operation of "data2" into Q1. FIG. 8C shows the data flow. Again, the T1 register is accessed, and this time the content of the T1 register is "16." The data is therefore stored in memory location 16 of bRAM. Again, the FRAM is popped to obtain the memory location in the bRAM for the next entry for Q1; this time the value is "17." The memory location 16 in the nRAM is loaded with the value "17," and likewise the T1 register is loaded with "17."

Figure 8D:
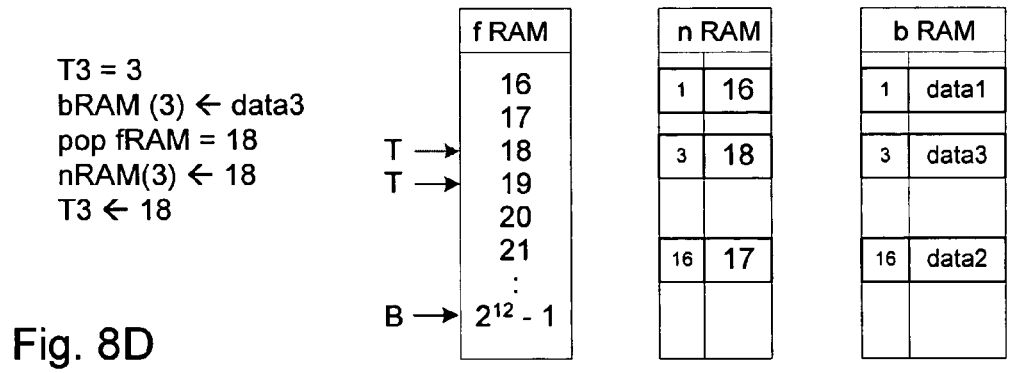

The next write operation illustrated in FIG. 8D is a write of "data3" to Q3. The initial value contained in the TOQ register for Q3 is "3" per the initialization sequence discussed above. Hence, "data3" will be written to memory location 3 in the bRAM. The next value popped from the fRAM is "18," which is then stored in memory location 3 in the nRAM. The T3 register is then loaded with the value "18."

FIG. 8E shows the details for the write operation of "data4" to Q1.

FIG. 8F shows the detail for the write operation of "data5" to Q3.

A read operation is then performed on Q1. As can be seen in FIG. 8G, the HOQ register for Q1 is accessed, in accordance with step 502 of FIG. 5. Since this is the first read operation on Q1, it contains the initial value of "1". This references the memory location 1 in bRAM, which from FIG. 8B, stores the data for the first entry in Q1. The data is therefore read from bRAM(1), step 504. Next, a memory location in the nRAM identified by the H1 register (HOQ register for Q1) is accessed, step 506. Recall from FIG. 8B that this memory location contains the memory location in the bRAM which contains the data for the next entry in Q1. Next, the value contained in the H1 register is pushed onto the fRAM, thus freeing the memory location in the bRAM identified by the value in the H1 register. FIG. 8G shows the fRAM now contains the value "1" and the bottom of queue (B) points to "1."

Figure 8H:
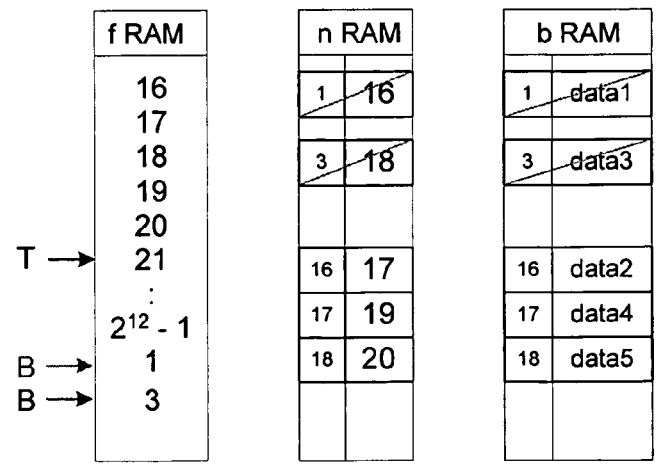

FIG. 8H shows that another read operation is performed, this time on Q3. The HOQ register (H3) for Q3 is accessed. The H3 register contains its initial value of "3" and so the data in bRAM(3) is read out. The memory location in nRAM(3) is accessed to produce the value "18." As can be seen from the write operation shown in FIG. 8D, the value "18" is the memory location in bRAM that contains that data for the next entry in Q3. The value ("3") stored in the H3 register is pushed onto the queue in the fRAM. The H3 register is then loaded with "18," the value obtained from the nRAM.

Figure 8I:
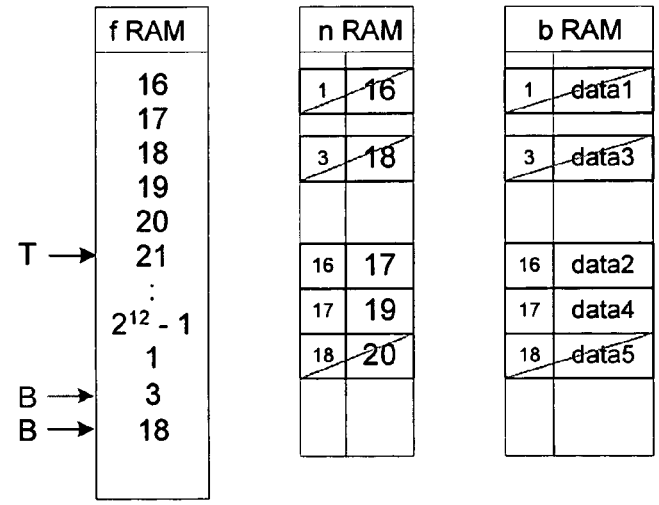

FIG. 8I shows the details for another read operation on Q3. This read operation empties the queue. It is worth noting that the H3 register is loaded with the value "20." However, since the queue is empty, a subsequent read attempt should not be permitted. This can be enforced by the control logic 132, or at a higher level component in a system that incorporates the invention. Referring to FIG. 8F, it can be seen that a write operation to Q3 will place the data in memory location "20" of the bRAM.

Figure 8J:
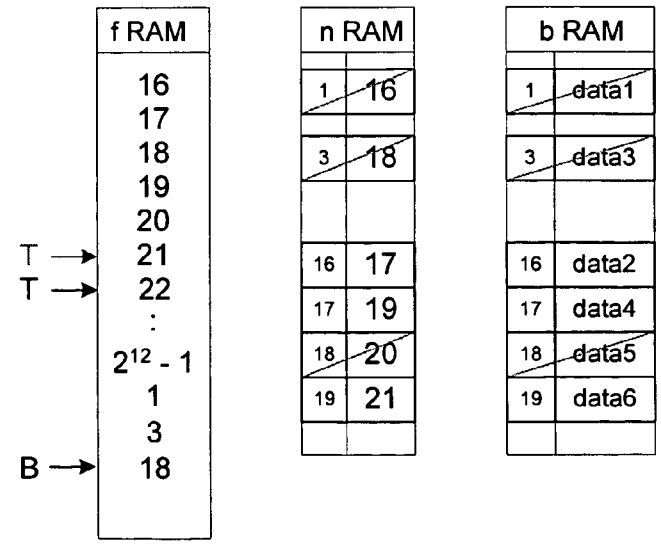

FIG. 8J shows a write operation of "data6" to Q1.

It can be appreciated from the foregoing sequence of write operations and read operations, that the queue sizes are not statically determined. Each queue can grow as much as needed, so long as there is sufficient buffer RAM 104. Memory allocated to a queue is immediately released to a free memory pool maintained by the free pointer RAM, so that the memory can be allocated to other queues. Speed of operation for allocating and deallocating memory for the queues is greatly enhanced by having a memory for storing the queue pointers, and a memory to track the free memory pool and a separate memory for maintaining the linkage information for the queues. The invention allows for scaling up to larger numbers of queues (i.e., N>16) without affecting performance in queue access time.

What is claimed is:

1. A hardware queue circuit for managing a plurality of linked lists comprising:
    a head of queue (HOQ) memory to store information representative of a head entry associated with each of the linked lists;
    a tail of queue (TOQ) memory to store information representative of a tail entry of each of the linked lists;
    a data memory to store data associated with entries of the linked lists;
    a next pointer memory;
    an address bus configured to selectively deliver information the HOQ memory and from the TOQ memory to the data memory in order to access a memory location in the data memory and to the next pointer memory in order to access a memory location in the next pointer memory;
    a free pointer memory;
    a first data bus configured to deliver data from an accessed memory location in the next point memory to the free pointer memory and to the HOQ memory; and
    a second data bus configured to deliver data from an accessed memory location in the free pointer memory to an accessed memory location in the next pointer memory.

2. The circuit of claim 1 wherein the HOQ memory comprises N first registers and the TOQ memory comprises N second registers.

3. The circuit of claim 1 further comprising a link length memory to store information representative of a length of each of the linked lists.

4. The circuit of claim 1 further comprising a controller component configured to effect a write operation of first data to a first linked list by operating the circuit to perform method steps of:
    obtaining a first value stored in a location in the TOQ memory that is associated with the first linked list;
    storing the first data in a location in the data memory that is determined from the first value;
    obtaining a second value stored in the free pointer memory;
    storing the second value in a memory location of the next pointer memory that is determined from the first value; and
    storing the second value in the location in the TOQ memory that is associated with the first linked list.

5. The circuit of claim 4 wherein the TOQ memory comprises a plurality of registers, wherein the first linked list is associated with one of the registers.

6. The circuit of claim 5 wherein the free pointer memory is organized as a queue and the step of obtaining the second value includes performing a pop operation on the free pointer memory.

7. The circuit of claim 1 further comprising a controller component configured to effect a read operation on a first linked list by operating the circuit to perform method steps of:
   obtaining a first value stored in a location in the HOQ memory that is associated with the first linked list;
   reading data stored in a location in the data memory that is determined from the first value;
   obtaining a second value stored in a memory location of the next pointer memory that is determined from the first value;
   storing the first value in the free pointer memory; and
   storing the second value in the location in the HOQ memory that is associated with the first linked list.

8. The circuit of claim 7 wherein the HOQ memory comprises a plurality of registers, wherein the first linked list is associated with one of the registers.

9. A method for operating hardware to access one or more linked lists comprising:
   accessing a first memory to obtain first queue data representative of a first linked list, the first memory configured to store a plurality of queue data representative of a plurality of linked lists, the first queue data representing at least one entry in the first linked list;
   accessing a first location in a second memory based on first address information contained in the first queue data, wherein data associated with the at least one entry can be written to the first location or read from the first location;
   accessing a third memory to obtain second address information representative of a second location in the second memory, the second location in the second memory for storing data associated with a next entry in the first linked list;
   storing either the first address information or the second address information in a fourth memory, depending on whether data is written to the first location or data is read from the first location; and
   associating the second address information with the first queue data.

10. The method of claim 9 wherein the first, second, third, and fourth memories, each is a memory component separate from the others.

11. The method of claim 9 wherein the first memory is a register file comprising a plurality of first registers and a plurality of second registers,
   each first register associated with a linked list, each first register storing a first location in the second memory, the first location for storing data associated with an entry that represents the beginning of a linked list,
   each second register associated with a linked list, each second register storing a second location in the second memory, the second location for storing data associated with an entry that represents the end of a linked list.

12. The method of claim 11 wherein the register file further comprises a plurality of third registers, each third register associated with a linked list, each third register storing a value indicative of the number of entries contained in its associated linked list.

13. The method of claim 9 wherein, when data is written to the first location, the third memory contains information representative of one or more addresses which represent available locations in the second memory for storing data, the fourth memory stores information which indicates an order in which data associated with a linked list is stored in the second memory, the second address information is a location in the second memory for storing data associated with a subsequent write operation to the first linked list, and the step of storing is a step of storing the second address information in the fourth memory.

14. The method of claim 13 further comprising determining if there is sufficient memory in the second memory when data is written to the first location.

15. The method of claim 13 further comprising incrementing a counter associated with the first linked list when data is written to the first location.

16. The method of claim 9 wherein, when data is read from the first location in the second memory, the third memory stores information which indicates an order in which data associated with a linked list is stored in the second memory, the fourth memory contains information representative of one or more addresses which represent available locations in the second memory for storing data, the second address information is a location in the second memory from which data will be read in response to a subsequent read operation on the first linked list, and step of storing is a step of storing the first address information in the fourth memory thereby making the first location available for storing data.

17. The method of claim 16 further comprising decrementing a counter associated with the first linked list when data is read from the first location.

18. Apparatus for accessing one or more linked lists comprising:
   a first memory for storing a plurality of queue data representative of a plurality of linked lists;
   a second memory;
   a third memory for storing link address information representative of an ordering of data in the second memory that are associated with a linked list;
   a fourth memory for storing free address information representative of unallocated memory locations in the second memory;
   means for accessing the first memory to obtain first queue data representative of a first linked list, the first queue data representing at least one entry in the first linked list
   means for accessing a first location in the second memory based on first address information contained in the first queue data, wherein data associated with the at least one entry can be written to the first location or read from the first location;
   means, responsive to a write operation, for:
      accessing the fourth memory to obtain second address information representative of a second location in the second memory;
      storing the second address information in the third memory; and
      storing the second address information in the first queue data,
      wherein data associated with a subsequent write operation will be stored the second location;
   means, responsive to a read operation, for:
      accessing the third memory to obtain third address information representative of a second location in the second memory;
      storing the first address information in the fourth memory; and storing the third address information in the first queue data, wherein a subsequent read operation will be made from the third location.

19. The apparatus of claim 18 wherein the first, second, third, and fourth memories, each is a memory component separate from the others.

20. The apparatus of claim 18 wherein the first memory is a register file comprising a plurality of first registers and a plurality of second registers, each first register associated with a linked list, each first register storing a first location in the second memory, the first location for storing data associated with an entry that represents the beginning of a linked list, each second register associated with a linked list, each second register storing a second location in the second memory, the second location for storing data associated with an entry that represents the end of a linked list.

* * * * *